(12) United States Patent
Lacy et al.

(10) Patent No.: US 9,970,302 B2
(45) Date of Patent: May 15, 2018

(54) HOT GAS PATH COMPONENT TRAILING EDGE HAVING NEAR WALL COOLING FEATURES

(71) Applicant: General Electric Company, Schenectady, NY (US)

(72) Inventors: Benjamin Paul Lacy, Greer, SC (US); Srikanth Chandrudu Kottilingam, Simpsonville, SC (US); Carlos Miguel Miranda, Greer, SC (US); Gary Michael Itzel, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 290 days.

(21) Appl. No.: 14/739,944

(22) Filed: Jun. 15, 2015

(65) Prior Publication Data

US 2016/0362985 A1    Dec. 15, 2016

(51) Int. Cl.
   F01D 5/18 (2006.01)
   F01D 9/04 (2006.01)
   (Continued)

(52) U.S. Cl.
   CPC ............. F01D 5/187 (2013.01); F01D 5/147 (2013.01); F01D 5/186 (2013.01); F01D 9/041 (2013.01);
   (Continued)

(58) Field of Classification Search
   CPC .... F01D 5/186; F01D 5/187; F05D 2260/202; F05D 2230/21; Y02T 50/676
   (Continued)

(56) References Cited

U.S. PATENT DOCUMENTS

| 4,142,824 A | 3/1979 | Andersen |
| 4,270,883 A | 6/1981 | Corrigan |

(Continued)

FOREIGN PATENT DOCUMENTS

| EP | 0 227 580 A2 | 7/1987 |
| EP | 2 381 070 A2 | 10/2011 |

(Continued)

OTHER PUBLICATIONS

U.S. Appl. No. 14/739,727, Miranda, et al., filed Jun. 15, 2015.
(Continued)

*Primary Examiner* — Matthew W Jellett
(74) *Attorney, Agent, or Firm* — Armstrong Teasdale LLP

(57) ABSTRACT

A hot gas path component includes a substrate having an outer surface and an inner surface. The inner surface defines an interior space. The outer surface defines a pressure side surface and a suction side surface. The pressure and suction side surfaces are joined together at a leading edge and at a trailing edge. A first cooling passage is formed in the suction side surface of the substrate. It is coupled in flow communication to the interior space. A second cooling passage, separate from the first cooling passage, is formed in the pressure side surface. The second cooling passage is coupled in flow communication to the interior space. A cover is disposed over at least a portion of the first and second cooling passages. The interior space channels a cooling fluid to the first and second cooling passages, which channel the cooling fluid therethrough to remove heat from the component.

18 Claims, 9 Drawing Sheets

(51) Int. Cl.
  *F01D 25/12* (2006.01)
  *F01D 5/14* (2006.01)
  *F01D 5/28* (2006.01)
(52) U.S. Cl.
  CPC .............. *F01D 25/12* (2013.01); *F01D 5/288* (2013.01); *F05D 2220/32* (2013.01); *F05D 2240/122* (2013.01); *F05D 2240/304* (2013.01); *F05D 2240/305* (2013.01); *F05D 2240/306* (2013.01); *F05D 2260/202* (2013.01); *F05D 2260/204* (2013.01); *Y02T 50/672* (2013.01); *Y02T 50/676* (2013.01)
(58) Field of Classification Search
  USPC .................................. 415/115, 116; 416/97 A
  See application file for complete search history.

(56) References Cited

U.S. PATENT DOCUMENTS

| | | | |
|---|---|---|---|
| 4,526,512 A | 7/1985 | Hook | |
| 5,062,768 A | 11/1991 | Marriage | |
| 5,263,820 A * | 11/1993 | Tubbs | B23P 15/02 |
| | | | 415/115 |
| 5,626,462 A * | 5/1997 | Jackson | C22C 32/00 |
| | | | 416/229 A |
| 5,640,767 A * | 6/1997 | Jackson | B23P 15/04 |
| | | | 118/427 |
| 5,660,524 A | 8/1997 | Lee et al. | |
| 6,383,602 B1 * | 5/2002 | Fric | F01D 5/186 |
| | | | 415/115 |
| 6,896,036 B2 | 5/2005 | Schneiders et al. | |
| 6,921,014 B2 | 7/2005 | Hasz et al. | |
| 6,942,449 B2 | 9/2005 | Boyer | |
| 7,364,405 B2 | 4/2008 | Cunha et al. | |
| 7,549,844 B2 * | 6/2009 | Liang | F01D 5/187 |
| | | | 415/177 |
| 7,621,718 B1 | 11/2009 | Liang | |
| 8,070,436 B2 | 12/2011 | Mitchell | |
| 8,070,441 B1 | 12/2011 | Liang | |
| 8,167,559 B2 | 5/2012 | Liang | |
| 8,176,720 B2 | 5/2012 | Beeck | |
| 8,317,475 B1 | 11/2012 | Downs | |
| 8,414,263 B1 | 4/2013 | Liang | |
| 8,491,264 B1 * | 7/2013 | Liang | F01D 5/187 |
| | | | 416/97 R |
| 8,561,411 B2 | 10/2013 | DiBenedetto | |
| 8,578,720 B2 | 11/2013 | Ebert et al. | |
| 8,651,805 B2 | 2/2014 | Lacy et al. | |
| 8,807,943 B1 | 8/2014 | Liang | |
| 9,206,696 B2 | 12/2015 | Bunker et al. | |
| 9,435,208 B2 * | 9/2016 | Bunker | F01D 5/147 |
| 9,458,725 B2 | 10/2016 | Morgan et al. | |
| 9,476,306 B2 | 10/2016 | Bunker | |
| 2010/0183428 A1 | 7/2010 | Liang | |
| 2011/0110771 A1 | 5/2011 | Morgan et al. | |
| 2011/0259017 A1 | 10/2011 | Lacy et al. | |
| 2012/0111545 A1 | 5/2012 | Bunker et al. | |
| 2012/0124832 A1 | 5/2012 | Bunker et al. | |
| 2012/0255870 A1 | 10/2012 | Rebak et al. | |
| 2012/0276308 A1 | 11/2012 | Rebak et al. | |
| 2012/0328451 A1 | 12/2012 | Lomas et al. | |
| 2013/0086784 A1 | 4/2013 | Bunker | |
| 2013/0101761 A1 | 4/2013 | Bunker et al. | |
| 2014/0004310 A1 | 1/2014 | Rebak et al. | |
| 2014/0110559 A1 | 4/2014 | Lee et al. | |
| 2015/0086408 A1 * | 3/2015 | Kottilingam | B22F 5/04 |
| | | | 419/5 |
| 2015/0096305 A1 | 4/2015 | Morgan et al. | |
| 2015/0251280 A1 | 9/2015 | Bunker | |
| 2016/0339544 A1 | 11/2016 | Xu et al. | |

FOREIGN PATENT DOCUMENTS

| | | |
|---|---|---|
| EP | 2 518 270 A2 | 10/2012 |
| EP | 2 540 971 A1 | 1/2013 |
| EP | 2 853 323 A2 | 4/2015 |
| GB | 803 650 A | 10/1958 |
| GB | 2 260 166 A | 4/1993 |
| WO | 2015/035363 A1 | 3/2015 |

OTHER PUBLICATIONS

U.S. Appl. No. 14/739,791, Miranda, et al., filed Jun. 15, 2015.
U.S. Appl. No. 14/739,849, Miranda, et al., filed Jun. 15, 2015.
Extended European Search Report and Opinion issued in connection with related EP Application No. 16173820.8 dated Nov. 11, 2016.
Extended European Search Report and Opinion issued in connection with related EP Application No. 16174145.9 dated Nov. 14, 2016.
Extended European Search Report and Opinion issued in connection with related EP Application No. 16174266.3 dated Nov. 18, 2016.
Extended European Search Report and Opinion issued in connection with corresponding EP Application No. 16174149.1 dated Dec. 6, 2016.

* cited by examiner

HOT GAS PATH COMPONENT TRAILING EDGE HAVING NEAR WALL COOLING FEATURES

FEDERAL RESEARCH STATEMENT

The subject matter of this disclosure was made with Government support under Contract No. DE-FC26-05NT42643, awarded by the Department of Energy (DOE), and the Government has certain rights in the subject matter claimed herein.

BACKGROUND

The field of the present disclosure relates generally to turbine engines, and more particularly to hot gas path components having trailing edge near wall cooling.

Gas turbine systems are widely utilized in fields such as power generation. A conventional gas turbine system includes a compressor, a combustor, and a turbine. During operation of the gas turbine system, various hot gas path components in the system are subjected to high temperature flows, which can cause the hot gas path components to fail. Since higher temperature flows generally result in increased performance, efficiency, and power output of the gas turbine system and are thus desired in a gas turbine system, the hot gas path components that are subjected to high temperature flows must be cooled to allow the gas turbine system to operate with flows at increased temperatures.

As the maximum local temperature of the hot gas path components approaches the melting temperature of the hot gas path components, forced air cooling becomes necessary. For this reason, airfoils of gas turbine buckets and nozzles often require complex cooling schemes in which air, typically bleed air, is forced through internal cooling passages within the airfoil, and then discharged through cooling holes or passages located at the airfoil surface, leading edge, and/or trailing edge to transfer heat from the hot gas path component.

In some known gas turbine systems, the hot gas path component cooling is achieved by locating impingement inserts within the component airfoil cavities, e.g., two or more cavities of a first stage nozzle of a gas turbine. In such known systems, the pressure and suction sides of the nozzle vane are impingement cooled. The post-impingement cooling air is then either discharged through film holes along the airfoil surface or sent to an additional circuit to convectively cool the airfoil trailing edge. Additional trailing edge circuits are often required due to insufficient space within the airfoil cavity to extend the aft impingement insert to the trailing edge.

Various strategies are known in the art for cooling the hot gas path components that are subjected to high temperature flows. For example, various trailing edge air cooling circuits use pins extending between the opposite sides of the airfoil for receiving the cooling flow for cooling the trailing edge portion. Pin cooling, however, is associated with a pressure drop and is often practical over very short distances. In some know cooling systems, turbulative convective channel designs have been used, resulting in a lower pressure drop. However, such know designs may achieve insufficient cooling efficiency to meet cooling performance requirements for the nozzle vane. Some known cooling systems combine the two cooling features, i.e., pin cooling and convective channel cooling circuits, however, there is a need for even further cooling efficiencies.

BRIEF DESCRIPTION

In one aspect, a hot gas path component is provided. The hot gas path component includes a substrate including an outer surface and an inner surface. The inner surface defines a first interior space. The outer surface defines a pressure side surface and a suction side surface. The pressure and suction side surfaces are joined together at a leading edge and at a trailing edge of the hot gas path component. The substrate includes a trailing edge portion. The hot gas path component also includes a first cooling passage formed in the suction side surface of the trailing edge portion of the substrate and coupled in flow communication to the first interior space. The first cooling passage includes a first end and a second end. A second cooling passage, separate from said first cooling passage, is formed in the pressure side surface of the trailing edge portion of the substrate. The second cooling passage is coupled in flow communication to the first interior space. The second cooling passage includes a first end and a second end. The component also includes a cover disposed over at least a portion of the first and second cooling passages. The first interior space channels a cooling fluid to the first and second cooling passages. The first and second cooling passages channel the cooling fluid therethrough to transfer heat away from the cover and the substrate.

In another aspect, a gas turbine engine is provided. The gas turbine engine includes a compressor, a turbine coupled to the compressor, and a hot gas path component disposed in a least one of the compressor and the turbine. The hot gas path component includes a substrate including an outer surface and an inner surface. The inner surface defines a first interior space. The outer surface defines a pressure side surface and a suction side surface. The pressure and suction side surfaces are joined together at a leading edge and at a trailing edge of the hot gas path component. The substrate includes a trailing edge portion. The hot gas path component also includes a first cooling passage formed in the suction side surface of the trailing edge portion of the substrate and coupled in flow communication to the first interior space. The first cooling passage includes a first end and a second end. A second cooling passage, separate from said first cooling passage, is formed in the pressure side surface of the trailing edge portion of the substrate. The second cooling passage is coupled in flow communication to the first interior space. The second cooling passage includes a first end and a second end. The component also includes a cover disposed over at least a portion of the first and second cooling passages. The first interior space channels a cooling fluid to the first and second cooling passages. The first and second cooling passages channel the cooling fluid therethrough to transfer heat away from the cover and the substrate.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a", "an", and "the" include plural references unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
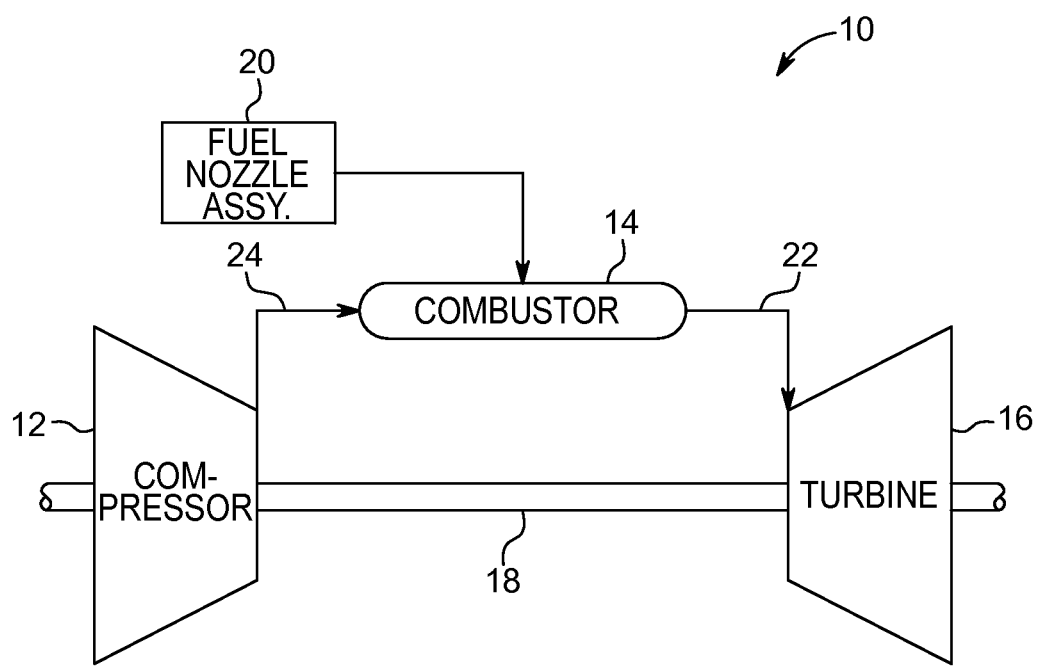
FIG. 1 is a schematic view of an exemplary gas turbine engine.

FIG. 1 is a schematic view of a rotary machine, i.e., a turbomachine, and more specifically, a turbine engine. In the exemplary embodiment, the turbine engine is a gas turbine engine 10. Alternatively, the rotary machine is any other turbine engine and/or rotary machine, including, without limitation, a steam turbine engine, a centrifugal compressor, and a turbocharger. In the exemplary embodiment, gas turbine engine 10 includes at least one of each of a compressor 12, a combustor 14, a turbine 16, and a fuel nozzle 20. Fuel nozzle 20 is configured to inject and mix fuel (not shown) with pressurized air 24 in combustor 14. Combustor 14 ignites and combusts the fuel-air mixture (not shown) and then passes a hot gas flow 22 into turbine 16. Turbine 16 includes one or more stators having fixed vanes or blades (not shown in FIG. 1), and one or more rotors having blades or buckets (not shown in FIG. 1) that rotate relative to the stators. Hot gas flow 22 passes over the turbine rotor blades, thereby driving the turbine rotor to rotate. Turbine 16 is coupled to a single rotatable shaft 18 such that it rotates the shaft as hot gas flow 22 passes over the turbine blades. In alternative embodiments, rotatable shaft 18 is a plurality of shaft segments coupled together to form rotatable shaft 18. In the exemplary embodiment, rotatable shaft 18 is coupled to compressor 12. Compressor 12 includes blades (not shown) rigidly mounted to a rotor (not shown) that is driven to rotate by rotatable shaft 18. As air passes over the rotating blades, air pressure increases, thereby providing combustor 14 with sufficient pressurized air 24 for proper combustion.

Figure 2:
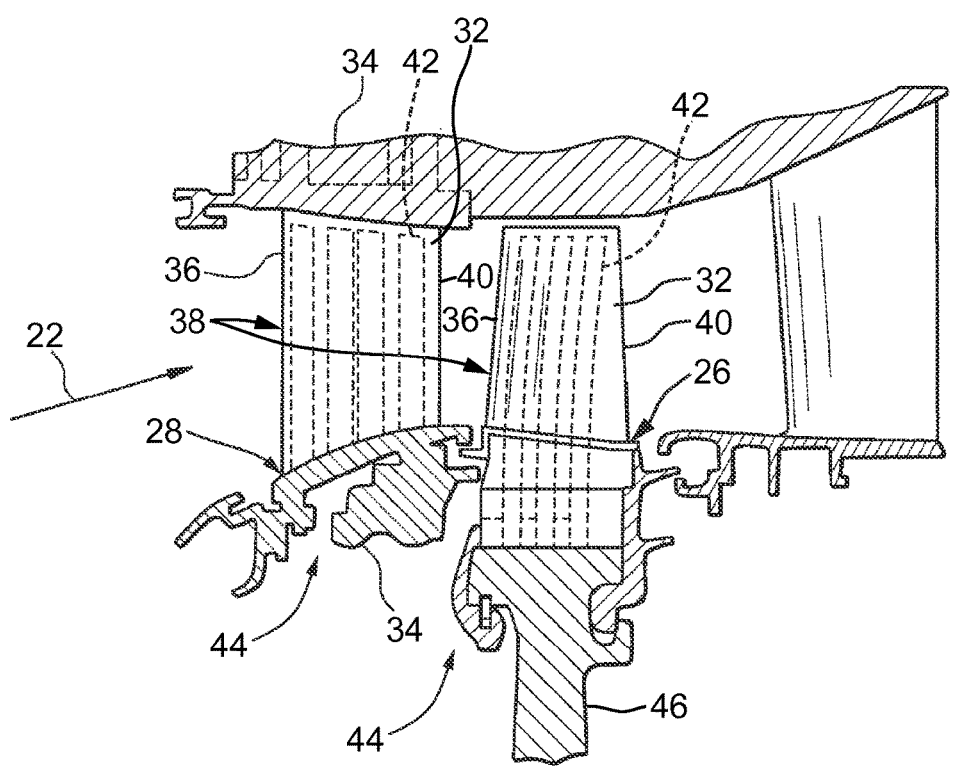
FIG. 2 is a schematic view of a portion of a turbine of the gas turbine engine shown in FIG. 1.

FIG. 2 is a schematic view of a portion of turbine 16 of gas turbine engine 10 shown in FIG. 1. In the exemplary embodiment, turbine 16 includes a turbine blade 26 and a stator vane 28. As described herein, turbine blade 26 and stator vane 28 each are referred to as a hot gas path component 38. A hot gas path component is any component of gas turbine engine 10 that is at least partially exposed to hot gas flow 22 through gas turbine engine 10, e.g., where the hot gas flow 22 operating temperature, in one example, is above 2500 degrees Fahrenheit (° F.) (~1371 degrees Celsius (° C.)). For example, hot gas path component 38 includes, without limitation, turbine blade 26 and other bucket assemblies (also known as blades or blade assemblies), stator vane 28 and other nozzle assemblies (also known as vanes or vane assemblies), shroud assemblies, transition pieces, retaining rings, and compressor exhaust components. Hot gas path component 38 is not limited to the examples described above, but is any component that is at least partially exposed to hot gas flow 22. In addition, hot gas path component 38 is not limited to components of gas turbine engine 10, but may be any type of component that is exposed to high temperature flows. It should be understood that the description and figures that utilize a turbine, an airfoil, and a micro-channel are exemplary only. Additionally, it should be understood that the micro-channels described herein may be used in any suitable component through which a cooling fluid such as, water, steam, air, fuel and/or any other suitable fluid is directed for cooling the component and/or for maintaining a temperature of the component.

When hot gas path component 38 is exposed to hot gas flow 22, hot gas path component 38 is heated by hot gas flow 22 and can reach a temperature at which hot gas path component 38 is substantially degraded or fails. Thus, in order to enable gas turbine engine 10 to operate with hot gas flow 22 at a high temperature, and increasing the efficiency, performance, and/or life of gas turbine engine 10, a cooling system 42 for hot gas path component 38 is required.

As described herein, micro-channel cooling facilitates significantly reducing the cooling requirements of hot gas path component 38 by placing the cooling features as close as possible to the heated region of hot gas path component 38, thus reducing the temperature difference between a hot side and a cold side of hot gas path component 38 for a given heat transfer rate.

In general, cooling system 42 includes a series of small passages, or micro-channels 30 (not shown in FIGS. 1-2), formed in the surface of hot gas path component 38. As used herein, "small" or "micro" channel dimensions include a width and depth in the range between approximately 0.004 inches (in.)(0.10 millimeters (mm)) and approximately 0.100 in. (2.54 mm). A cooling fluid, e.g., pressurized air 24, is provided to the micro-channels from a plenum, and the cooling fluid flows through each of the micro-channels, cooling hot gas path component 38.

In the exemplary embodiment, hot gas path components 38 each include an airfoil 32 having a leading edge 36 that is directly exposed to hot gas flow 22. In addition, airfoil 32 includes a trailing edge 40 axially opposite leading edge 36. Hot gas path component 38 is cooled by pressurized air 24 routed from one or more stages of compressor 12 through a casing 34 of gas turbine engine 10. In the exemplary embodiment, pressurized air 24 is described as the cooling fluid used to cool the components 38 exposed to hot gas flow 22, e.g., turbine blade 26 and stator vane 28. In alternative embodiments, a fluid other than pressurized air 24 may be used to cool components exposed to hot gas flow 22. It should also be appreciated that the term "fluid" as used herein includes any medium or material that flows, including, but not limited to gas, steam, and air. In the exemplary embodiment, at least one cooling system 42 is defined in each hot gas path component 38 and is coupled in flow communication with a cooling fluid supply conduit 44 formed in casing 34. In the exemplary embodiment, cooling fluid supply conduit 44 is fluidly connected to compressor 12.

In operation, gas turbine engine 10 ingests air into compressor 12. Compressor 12, rotating at a high rotational speed compresses or pressurizes the air and channels a portion of pressurized air 24 to combustor 14 and a portion of pressurized air 24 to other areas of gas turbine engine 10 for use in cooling components 38 exposed to heat generated by gas turbine engine 10. Pressurized air 24 is mixed with fuel in combustor 14 and ignited to generate hot gas flow 22. Hot gas flow 22 is channeled from combustor 14 toward turbine 16 where hot gas flow 22 passes over hot gas path components 38, impacting turbine blade 26 connected to a rotor wheel 46. Rotor wheel 46 is rotated by hot gas flow 22 impacting turbine blade 26. Hot gas flow 22 also transfers heat to hot gas path components 38. A portion of pressurized air 24 is channeled through cooling system 42 formed in hot gas path components 38 to facilitate cooling the components.

Figure 3:
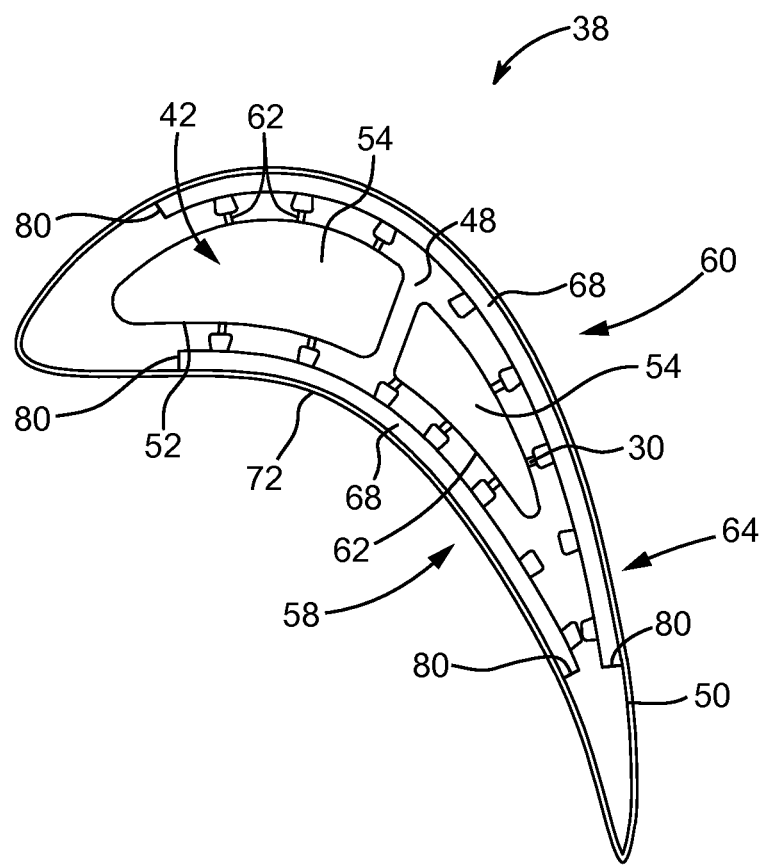
FIG. 3 is a schematic cross-section of a typical airfoil of one of a plurality of hot gas path components shown in FIG. 2, illustrating a portion of a cooling system formed therein.
Figure 4:
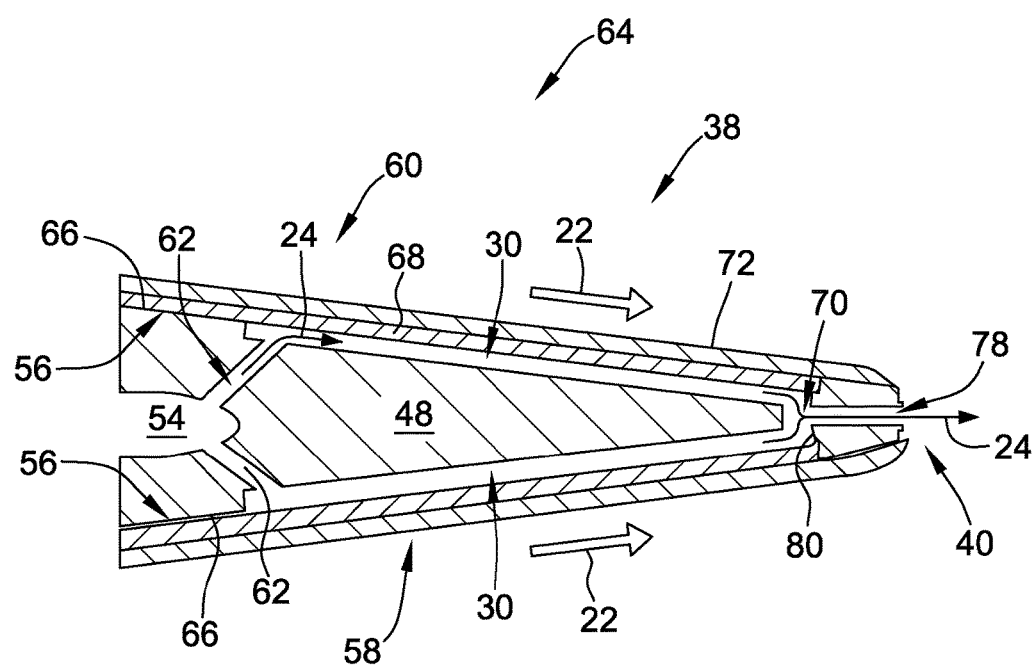
FIG. 4 is an enlarged view of a trailing edge portion of another typical airfoil of one of the hot gas path components shown in FIG. 2, illustrating a first embodiment of an arrangement for cooling the trailing edge portion of the airfoil with micro-channels formed on both a pressure side surface and a suction side surface of the airfoil.

Exemplary hot gas path components 38 are described herein with reference to FIGS. 3-9. Corresponding reference characters indicate corresponding parts throughout the several views of FIGS. 3-9. FIG. 3 is a schematic cross-section of a typical airfoil 32 of one of hot gas path components 38 of FIG. 2, illustrating a portion of a typical cooling system 42 formed therein. FIG. 4 is an enlarged view of a trailing edge portion 64 of another typical airfoil 32 of one of hot gas path components 38 of FIG. 2, illustrating a first embodiment of an arrangement for cooling trailing edge portion 64 of airfoil 32 with micro-channels 30 formed on both pressure side surface 58 and suction side surface 60 of airfoil 32. When hot gas path component 38 is exposed to a hot gas flow 22, the heat transferred to hot gas path component 38 can reach a temperature at which hot gas path component 38 may rapidly deteriorate. Cooling system 42 facilitates cooling hot gas path component 38 and enables gas turbine engine 10 to function with hot gas flow 22 at an increased temperature, which increases the efficiency and performance of gas turbine engine 10.

In the exemplary embodiment, hot gas path component 38 includes a substrate 48 having an outer surface 50 and an inner surface 52. As shown, for example in FIGS. 3 and 4, inner surface 52 defines at least one hollow, interior space or plenum 54. Outer surface 50 of substrate 48 defines a concave pressure side surface 58 and a convex suction side surface 60 where the pressure and suction side surfaces 58,60 are joined together at leading edge 36 and at trailing edge 40 of hot gas path component 38.

In the exemplary embodiment, hot gas path component 38 is formed by a casting process such as, but not limited to, an investment casting process, and is fabricated from any suitable material depending on the intended application for hot gas path component 38. For example, without limitation, hot gas path component 38 can be formed from Ni-base, Co-base, and Fe-base superalloys and the like. Some Ni-base superalloys are known to be advantageous because of a combination of desirable properties including high temperature strength and high temperature creep resistance. The material used to form substrate 48 may also include a NiAl intermetallic alloy, as these alloys are also known to possess a combination of superior properties including high temperature strength and high temperature creep resistance that are advantageous for use in turbine engine applications used for aircraft. In alternative embodiments, substrate 48 is formed from any material that enables substrate 48 to function as described herein.

As described herein, cooling system 42 includes a series of small passages, or micro-channels 30, formed in substrate 48 of hot gas path component 38. In the exemplary embodiment, micro-channels 30 are formed in outer surface 50 of substrate 48 by either a casting process or by a casting process and a finish machining process. Alternatively, micro-channels 30 may be formed using a variety of techniques. For example, without limitation, techniques for forming micro-channels 30 include laser machining, water jet machining, electro-chemical machining (ECM), electro-discharge machining (EDM), photolithography, or any other process capable of providing micro-channels with proper sizes and tolerances. It should be understood that the EDM process can include a multi-axis computer numerically controlled (CNC) unit. CNC units enable movement of the cutting tool along a number of axes, including X, Y, and Z axes, as well as rotational axes. In addition, micro-channels 30 can extend between a first end and a second end in any lengthwise configuration, for example, without limitation, straight, curved, or having multiple curves.

After casting hot gas path component 38, micro-channels 30 can be finished machined into outer surface 50 of substrate 48. One or more inlet passages 62 connecting micro-channels 30 to plenum 54 are drilled using, for example, without limitation, electro-discharge machining (EDM) or any conventional drilling method that enables inlet passages 62 to be formed as described herein. Alternatively, micro-channels 30, inlet passages 62, and at least a portion of plenum 54, as described herein, is 3D printed using direct metal laser melting (DMLM) processing. In another alternative embodiment, a trailing edge portion 64 of airfoil 32 is formed by machined pieces that are joined via brazing or diffusion bonding and this trailing edge portion 64 is then joined to airfoil 32. As used here, the "trailing edge portion 64" means being within about thirty percent of the surface length of substrate 48 from trailing edge 40, as measured on either side of substrate 48 between leading edge 36 and trailing edge 40.

In the exemplary embodiment, hot gas path component 38 includes one or more recesses 56 formed in outer surface 50 of hot gas path component 38. Micro-channels 30 are formed in a bottom surface 66 of each of recesses 56 and are covered by a braze sheet or pre-sintered preform (PSP) 68. Recesses 56 are offset from the outer surfaces of hot gas path component 38 a predefined, substantially uniform distance such that bottom surface 66 of recesses 56 conforms to the shape of outer surface 50 of hot gas path component 38. For example, without limitation, a recess 56 formed in convex suction side surface 60 of airfoil 32 conforms to the airfoil surface shape and is offset a predefined distance substantially equal to a thickness of braze sheet 68. Thus, the original airfoil shape and surface location is established by the application of braze sheet 68 to recess 56. In an alternative embodiment, substrate 48 is free of recesses 56 and micro-channels 30 are formed in outer surface 50. In another embodiment, recess 56 is an open sided recess, i.e., recess 56 includes at least one recess edge 80 bounding recess 56.

As shown in FIG. 4, micro-channels 30, formed in airfoil 32, extend substantially axially, i.e., generally parallel with hot gas flow 22. Alternatively, micro-channels 30 can be disposed at any relative locations and extend in any direction that enables cooling system 42 to function as described herein, for example, without limitation, micro-channels 30 may comprise a serpentine configuration. In the exemplary embodiment, inlet passages 62 may be individually coupled in flow communication to airfoil 32 or may be coupled in flow communication to a common trough or plenum 54. An outlet passage 78 may couple the exhaust ends of micro-channels 30 together to exhaust pressurized air 24 through trailing edge 40 of hot gas path component 38, or may be coupled in flow communication to a common trough or end plenum 70 (not shown in FIG. 4).

In the exemplary embodiment, hot gas path component 38 includes a coating 72 formed over at least a portion of outer surface 50 and braze sheets 68, forming a protective material layer on hot gas path component 38. In the exemplary embodiment, coating 72 includes at least two material layers, for example, a bond coat 74 and a thermal barrier coating (TBC) 76. Bond coat 74 is any appropriate bonding material. For example, without limitation, bond coat 74 has a chemical composition MCrAl(X), where "M" is an element selected from the group consisting of Fe, Co, Ni, and various combinations thereof. "X" is an element selected from the group consisting of gamma prime formers, solid solution strengtheners, consisting of, for example, Ta, Re, and reactive elements, such as Y, Zr, Hf, Si, and grain boundary strengtheners consisting of B, C, and combinations thereof. Bond coat 74 may be applied to substrate 48 and braze sheets 68 by a variety of processes described further herein, for example, by an ion plasma deposition process or a thermal spray process. Alternatively, bond coat 74 may be a diffusion aluminide bond coat, such as a coating having the chemical composition NiAl or PtAl, and bond coat 74 may be applied to the substrate 48 and braze sheets 68 through, for example, vapor phase aluminiding or chemical vapor deposition.

TBC 76 is any appropriate thermal barrier material. For example, without limitation, TBC 76 is a yttria-stabilized zirconia and may be applied to hot gas path component 38 through a physical vapor deposition process or thermal spray process as described herein. Alternatively, TBC 76 may be a ceramic, for example, without limitation, a thin layer of zirconia modified by other refractory oxides such as oxides formed from Group IV, V and VI elements or oxides modified by Lanthanide series elements such as La, Nd, Gd, Yb, and the like.

For particular configurations, coating 72 has a thickness in the range of 0.1 to 2.0 millimeters, and more particularly, in the range of 0.1 to 1 millimeter, and still more particularly 0.1 to 0.5 millimeters for industrial gas turbine components. However, other thicknesses may be utilized depending on the requirements for a particular hot gas path component 38. In alternative embodiments, hot gas path component 38 can be formed from a high temperature ceramic matrix composite (CMC) and coating 72 can include an environmental barrier coating (EBC) system that includes one or more material layers.

In the exemplary embodiment, the layers of coating 72 are deposited onto hot gas path component 38 using a variety of techniques. In one embodiment, coating 72 is disposed over at least a portion of outer surface 50 of substrate 48 by performing an ion plasma deposition. Briefly, ion plasma deposition includes placing a cathode formed of a coating material into a vacuum environment within a vacuum chamber, providing substrate 48 within the vacuum environment, supplying a current to the cathode to form a cathodic arc upon a cathode surface resulting in erosion or evaporation of coating material from the cathode surface, and depositing the coating material from the cathode upon the substrate outer surface 50. In one embodiment, the ion plasma deposition process includes a plasma vapor deposition process. Non-limiting examples of coating 72 include structural coatings, bond coatings, oxidation-resistant coatings, and thermal barrier coatings. In alternative embodiments, coating 72 is disposed over at least a portion of outer surface 50 of substrate 48 by performing a thermal spray process. For example, without limitation, the thermal spray process includes combustion spraying and/or plasma spraying. The combustion spraying process includes high velocity oxygen fuel spraying (HVOF) or high velocity air fuel spraying (HVAF). The plasma spraying process includes atmospheric (such as air or inert gas) plasma spray or low pressure plasma spray (LPPS), which is also known as vacuum plasma spray (VPS). Alternatively, techniques for depositing one or more layers of coating 72 include, without limitation, sputtering, electron beam physical vapor deposition, electroless plating, electroplating, and any other process that enables coating 72 to function as described herein.

Figure 5:
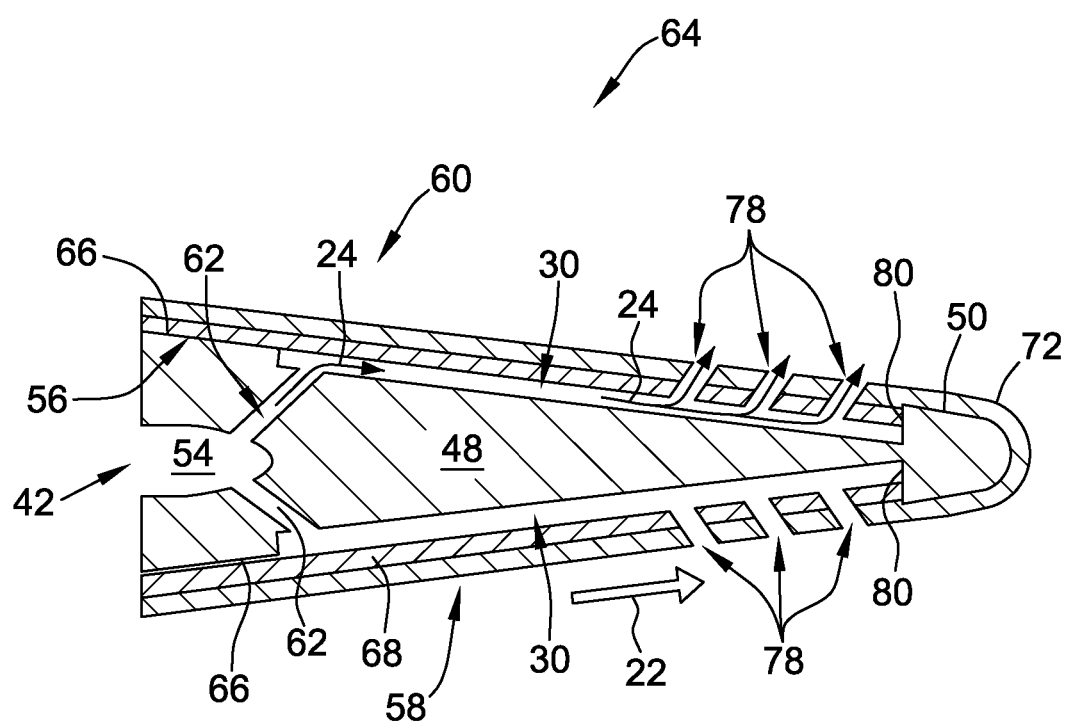
FIG. 5 is an enlarged view of a trailing edge portion of another typical airfoil of one of the hot gas path components shown in FIG. 2, illustrating a second embodiment of an arrangement for cooling the trailing edge portion of the airfoil.

FIG. 5 is an enlarged view of trailing edge portion 64 of another typical airfoil 32 of one of hot gas path components 38 of FIG. 2, illustrating a second embodiment of an arrangement for cooling trailing edge portion 64 of airfoil 32 with micro-channels 30 formed on both pressure side surface 58 and suction side surface 60 of airfoil 32. For the embodiment shown in FIG. 5, hot gas path component 38 includes one or more recesses 56 formed in outer surface 50 of hot gas path component 38. Cooling system 42 includes a series of micro-channels 30 formed in bottom surface 66 of each of recesses 56 and covered by braze sheet 68.

In the exemplary embodiment, micro-channels 30 are formed by either a casting process or by a casting process and a finish machining process. Alternatively, micro-channels 30 may be formed using a variety of techniques, including, without limitation, laser machining, water jet machining, ECM processes, EDM processes, photolithography, or any other process capable of providing micro-channels with proper sizes and tolerances. In addition, micro-channels 30 can have any lengthwise configuration, for example, without limitation, straight, curved, or having multiple curves. After casting hot gas path component 38, micro-channels 30 can be finished machined. One or more inlet passages 62 are formed to connect micro-channels 30 to plenum 54.

In the exemplary embodiment, recesses 56 are offset from outer surface 50 of hot gas path component 38 a predefined, substantially uniform distance such that bottom surface 66 of recess 56 conforms to the shape of outer surface 50. For example, without limitation, a recess 56 formed in convex suction side surface 60 of airfoil 32 conforms to the airfoil surface shape and is offset a predefined distance substantially equal to a thickness of braze sheet 68. Thus, the original airfoil shape and surface location is established by the application of braze sheet 68 to recess 56. As shown in FIG. 5, recess 56 is an open sided recess, i.e., recess 56 includes recess edge 80 bounding recess 56 at trailing edge 40. At least one edge of braze sheet 68 abuts recess edge 80.

As shown in FIG. 5, micro-channels 30 extend substantially axially, i.e., generally parallel with hot gas flow 22. Alternatively, micro-channels 30 can be disposed at any relative locations and extend in any direction that enables cooling system 42 to function as described herein, for example, without limitation, micro-channels 30 may comprise a serpentine configuration. In the exemplary embodiment, inlet passages 62 may be individually coupled in flow communication to plenum 54. Hot gas path component 38 includes one or more film cooling holes or outlet passages 78 formed in flow communication with micro-channels 30 to exhaust pressurized air 24 through at least one of side surfaces 58, 60 along trailing edge portion 64. Outlet passages 78 may be any shaped passage or hole that enables outlet passages 78 to function as described herein. In one embodiment, micro-channel 30 includes a single outlet passage 78 positioned generally at an end of micro-channel 30. In the illustrated embodiment, micro-channel 30 includes more than one outlet passage 78 spaced apart along a length of micro-channel 30, thus forming a trench exit micro-channel. It is contemplated that each discrete micro-channel 30 can include any number of film cooling holes or outlet passages 78 that enable cooling system 42 to function as described herein.

In the exemplary embodiment, hot gas path component 38 includes coating 72 formed over at least a portion of outer surface 50 and braze sheets 68. As described herein, coating 72 includes at least two material layers, for example, a bond coat 74 and a thermal barrier coating (TBC) 76. Bond coat 74 is any appropriate bonding material described herein, and TBC 76 is any appropriate thermal barrier material described herein. In alternative embodiments, hot gas path component 38 can be formed from a high temperature ceramic matrix composite (CMC) and coating 72 can include an environmental barrier coating (EBC) system that includes one or more material layers.

Figure 6:
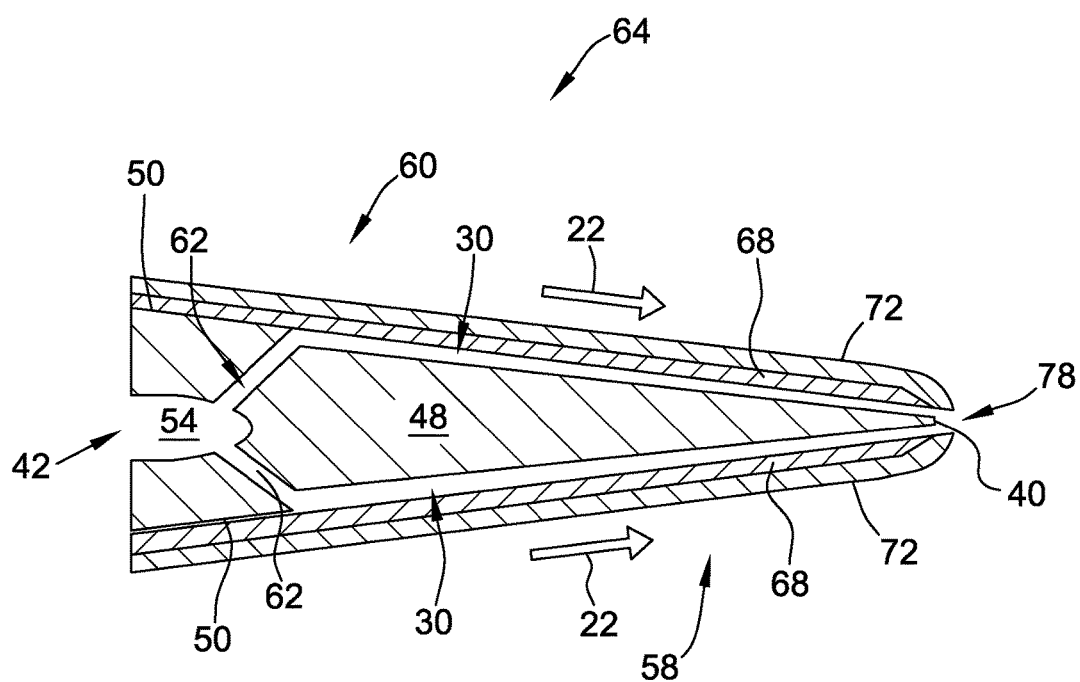
FIG. 6 is an enlarged view of a trailing edge portion of another typical airfoil of one of the hot gas path components shown in FIG. 2, illustrating a third embodiment of an arrangement for cooling the trailing edge portion of the airfoil.

FIG. 6 is an enlarged view of trailing edge portion 64 of another typical airfoil 32 of one of hot gas path components 38 of FIG. 2, illustrating a third embodiment of an arrangement for cooling trailing edge portion 64 of airfoil 32 with micro-channels 30 formed on both pressure side surface 58 and suction side surface 60 of airfoil 32. For the embodiment shown in FIG. 6, cooling system 42 of hot gas path component 38 includes a series of micro-channels 30 formed in outer surface 50 of airfoil 32 and covered by braze sheets 68. As described herein, micro-channels 30 are formed by either a casting process or by a casting process and a finish machining process. Alternatively, micro-channels 30 may be formed using a variety of techniques, including, without limitation, laser machining, water jet machining, ECM processes, EDM processes, photolithography, or any other process capable of providing micro-channels with proper sizes and tolerances. In addition, micro-channels 30 can have any lengthwise configuration, for example, without limitation, straight, curved, or having multiple curves. After casting hot gas path component 38, micro-channels 30 can be finished machined. One or more inlet passages 62 are formed to connect micro-channels 30 to plenum 54.

In the exemplary embodiment, braze sheets 68 are coupled to outer surface 50 of hot gas path component 38 and conform to the shape of outer surface 50. For example, without limitation, a braze sheet 68 coupled to convex suction side surface 60 of airfoil 32 conforms to the airfoil surface shape so as to maintain the proper airfoil design. Thus, the original airfoil shape and outer surface location is established by the application of braze sheet 68 to airfoil 32.

As shown in FIG. 6, micro-channels 30 extend substantially axially, i.e., generally parallel with hot gas flow 22. Alternatively, micro-channels 30 can be disposed at any relative locations and extend in any direction that enables cooling system 42 to function as described herein, for example, without limitation, micro-channels 30 may comprise a serpentine configuration. In the exemplary embodiment, inlet passages 62 may be individually coupled in flow communication to plenum 54. Hot gas path component 38 includes an outlet passage 78 at trailing edge 40 formed in flow communication with each micro-channel 30, respectively, to exhaust pressurized air 24 at the trailing edge 40 of airfoil 32. Outlet passage 78 may be any shaped passage or hole that enables outlet passage 78 to function as described herein. In the exemplary embodiment, micro-channel 30 includes a single outlet passage 78 positioned generally in line and at an end of each micro-channel 30. It is contemplated that each discrete micro-channel 30 can include more than one outlet passage 78, for example, spaced along micro-channel 30 to exhaust pressurized air 24 through at least one of side surfaces 58, 60, to enable cooling system 42 to function as described herein.

In the exemplary embodiment, hot gas path component 38 includes coating 72 formed over at least a portion of outer surface 50 and braze sheets 68. As described herein, coating 72 includes at least two material layers, for example, a bond coat 74 and a thermal barrier coating (TBC) 76. Bond coat 74 is any appropriate bonding material described herein, and TBC 76 is any appropriate thermal barrier material described herein. In alternative embodiments, hot gas path component 38 can be formed from a high temperature ceramic matrix composite (CMC) and coating 72 can include an environmental barrier coating (EBC) system that includes one or more material layers.

Figure 7:
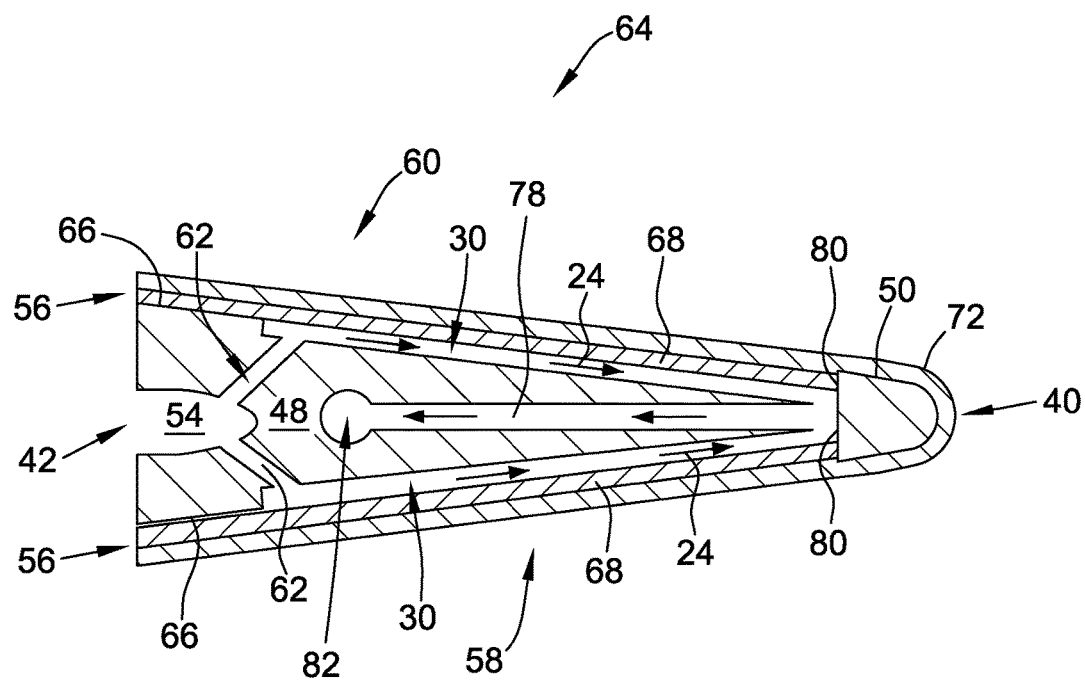
FIG. 7 is an enlarged view of a trailing edge portion of another typical airfoil of one of the hot gas path components shown in FIG. 2, illustrating a fourth embodiment of an arrangement for cooling the trailing edge portion of the airfoil.

FIG. 7 is an enlarged view of trailing edge portion 64 of another typical airfoil 32 of one of hot gas path components 38 of FIG. 2, illustrating a fourth embodiment of an arrangement for cooling trailing edge portion 64 of airfoil 32 with micro-channels 30 formed on both pressure side surface 58 and suction side surface 60 of airfoil 32. For the embodiment shown in FIG. 7, hot gas path component 38 includes one or more recesses 56 formed in outer surface 50 of hot gas path component 38. Cooling system 42 includes a series of micro-channels 30 formed in bottom surface 66 of each of recesses 56 and covered by braze sheet 68.

In the exemplary embodiment, micro-channels 30 are formed by either a casting process or by a casting process and a finish machining process. Alternatively, micro-channels 30 may be formed using a variety of techniques, including, without limitation, laser machining, water jet machining, ECM processes, EDM processes, photolithography, or any other process capable of providing micro-channels with proper sizes and tolerances. In addition, micro-channels 30 can have any lengthwise configuration, for example, without limitation, straight, curved, or having multiple curves. After casting hot gas path component 38, micro-channels 30 can be finished machined. One or more inlet passages 62 are formed to connect micro-channels 30 to plenum 54.

In the exemplary embodiment, recesses 56 are offset from outer surface 50 of hot gas path component 38 a predefined, substantially uniform distance such that bottom surface 66 of recess 56 conforms to the shape of outer surface 50. For example, without limitation, a recess 56 formed in convex suction side surface 60 of airfoil 32 conforms to the airfoil surface shape and is offset a predefined distance substantially equal to a thickness of braze sheet 68. Thus, the original airfoil shape and surface location is established by the application of braze sheet 68 to recess 56. As shown in FIG. 5, recess 56 is an open sided recess, i.e., recess 56 includes recess edge 80 bounding recess 56 at trailing edge 40.

As shown in FIG. 7, micro-channels 30 extend substantially axially, i.e., generally parallel with hot gas flow 22. Alternatively, micro-channels 30 can be disposed at any relative locations and extend in any direction that enables cooling system 42 to function as described herein, for example, without limitation, micro-channels 30 may comprise a serpentine configuration. In the exemplary embodiment, inlet passages 62 may be individually coupled in flow communication to plenum 54. Outlet passage 78 is coupled in flow communication to micro-channels 30 and a common outlet trough or outlet plenum 82 to exhaust pressurized air 24 proximate trailing edge 40 of hot gas path component 38. In the exemplary embodiment, outlet plenum 82 is located upstream from trailing edge 40 and is configured to exhaust pressurized air 24 through one or more outlet passages or film cooling holes (not shown) that are located out of plane with micro-channels 30 shown in FIG. 7 and extend through at least one of side surfaces 58, 60 along trailing edge portion 64.

In the exemplary embodiment, hot gas path component 38 includes coating 72 formed over at least a portion of outer surface 50 and braze sheets 68. As described herein, coating 72 includes at least two material layers, for example, a bond coat 74 and a thermal barrier coating (TBC) 76. Bond coat 74 is any appropriate bonding material described herein, and TBC 76 is any appropriate thermal barrier material described herein. In alternative embodiments, hot gas path component 38 can be formed from a high temperature ceramic matrix composite (CMC) and coating 72 can include an environmental barrier coating (EBC) system that includes one or more material layers.

Figure 8:
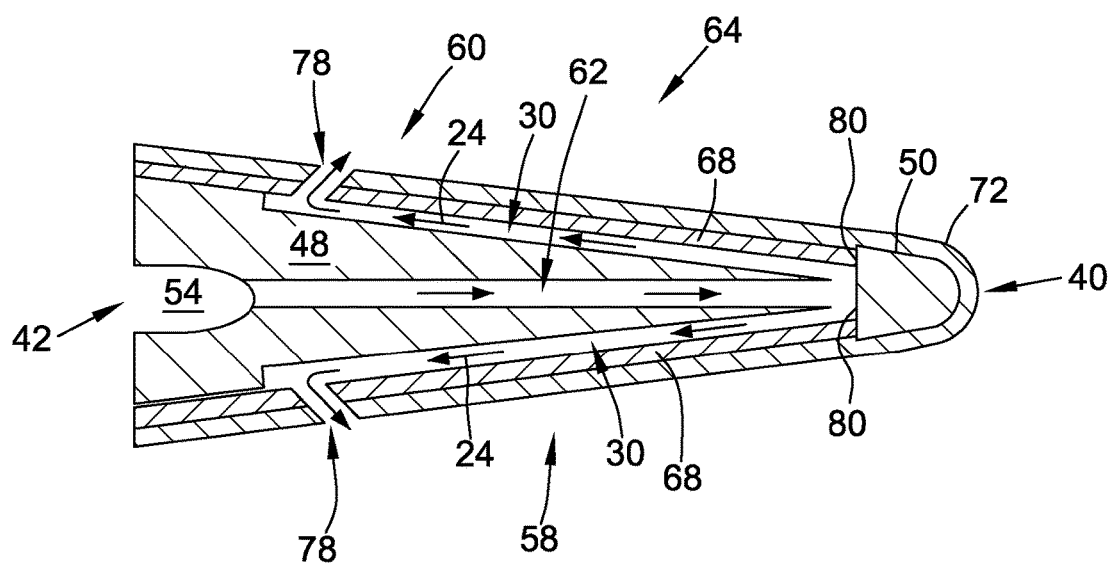
FIG. 8 is an enlarged view of a trailing edge portion of another typical airfoil of one of the hot gas path components shown in FIG. 2, illustrating a fifth embodiment of an arrangement for cooling the trailing edge portion of the airfoil.

FIG. 8 is an enlarged view of trailing edge portion 64 of another typical airfoil 32 of one of hot gas path components 38 of FIG. 2, illustrating a fifth embodiment of an arrangement for cooling trailing edge portion 64 of airfoil 32 with micro-channels 30 formed on both pressure side surface 58 and suction side surface 60 of airfoil 32. For the embodiment shown in FIG. 8, hot gas path component 38 includes one or more recesses 56 formed in outer surface 50 of hot gas path component 38. Cooling system 42 includes a series of micro-channels 30 formed in bottom surface 66 of each of recesses 56 and covered by braze sheet 68.

In the exemplary embodiment, micro-channels 30 are formed by either a casting process or by a casting process and a finish machining process. Alternatively, micro-channels 30 may be formed using a variety of techniques, including, without limitation, laser machining, water jet machining, ECM processes, EDM processes, photolithography, or any other process capable of providing micro-channels with proper sizes and tolerances. In addition, micro-channels 30 can have any lengthwise configuration, for example, without limitation, straight, curved, or having multiple curves. After casting hot gas path component 38, micro-channels 30 can be finished machined.

In the exemplary embodiment, recesses 56 are offset from outer surface 50 of hot gas path component 38 a predefined, substantially uniform distance such that bottom surface 66 of recess 56 conforms to the shape of outer surface 50. For example, without limitation, a recess 56 formed in convex suction side surface 60 of airfoil 32 conforms to the airfoil surface shape and is offset a predefined distance substantially equal to a thickness of braze sheet 68. Thus, the original airfoil shape and surface location is established by the application of braze sheet 68 to recess 56. As shown in FIG. 8, recess 56 is an open sided recess, i.e., recess 56 includes recess edge 80 bounding recess 56 at trailing edge 40.

In the exemplary embodiment, inlet passage 62 is formed substantially axially to connect micro-channels 30 to plenum 54. In particular, inlet passage 62 extends aftward from plenum 54 and is coupled in flow communication with one or more micro-channels 30 at trailing edge 40. As pressurized air 24 flows through plenum 54, it is exhausted afterward through inlet passage 62. Pressurized air 24 travels aftward toward micro-channels 30 where it makes a sharp turn forward, traveling through each of micro-channels 30. As shown in FIG. 8, micro-channels 30 extend substantially axially, i.e., generally parallel with hot gas flow 22. Alternatively, micro-channels 30 can be disposed at any relative locations and extend in any direction that enables cooling system 42 to function as described herein, for example, without limitation, micro-channels 30 may comprise a serpentine configuration.

In the exemplary embodiment, hot gas path component 38 includes one or more film cooling holes or outlet passages 78 formed in flow communication with micro-channels 30 to exhaust pressurized air 24 through at least one of side surfaces 58, 60 along trailing edge portion 64. Outlet passages 78 may be any shaped passage or hole that enables outlet passages 78 to function as described herein. In one embodiment, micro-channel 30 includes a single outlet passage 78 positioned generally at the anterior end of micro-channels 30. In the illustrated embodiment, micro-channel 30 includes one outlet passage 78. Alternatively, micro-channels 30 include more than one outlet passage 78 spaced apart along a length of micro-channel 30, thus forming a trench exit micro-channel. It is contemplated that each discrete micro-channel 30 can include any number of film cooling holes or outlet passages 78 that enable cooling system 42 to function as described herein.

In the exemplary embodiment, hot gas path component 38 includes coating 72 formed over at least a portion of outer surface 50 and braze sheets 68. As described herein, coating 72 includes at least two material layers, for example, a bond coat 74 and a thermal barrier coating (TBC) 76. Bond coat 74 is any appropriate bonding material described herein, and TBC 76 is any appropriate thermal barrier material described herein. In alternative embodiments, hot gas path component 38 can be formed from a high temperature ceramic matrix composite (CMC) and coating 72 can include an environmental barrier coating (EBC) system that includes one or more material layers.

Figure 9:
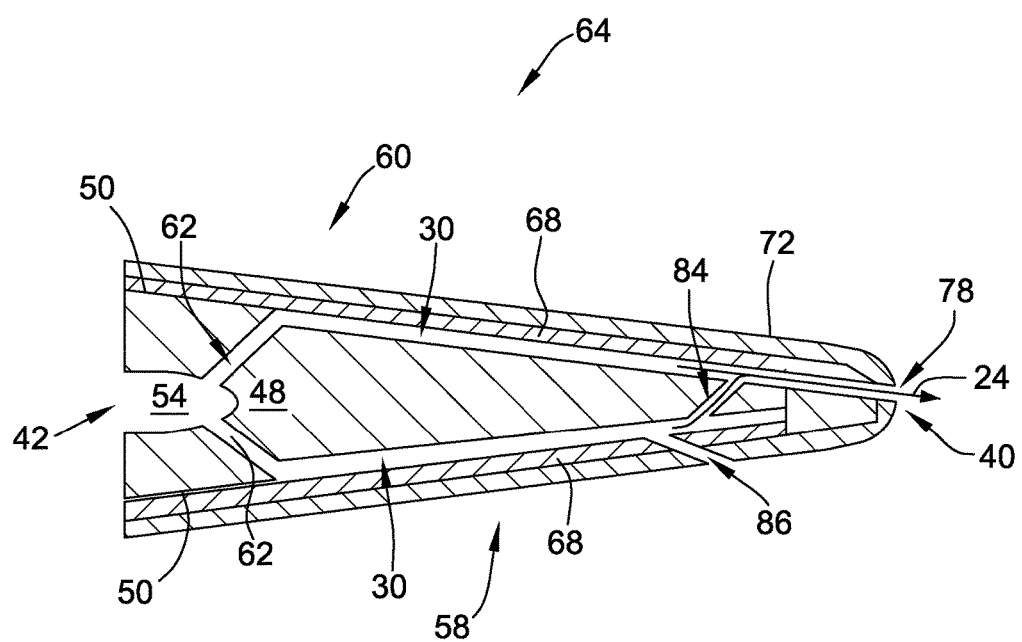
FIG. 9 is an enlarged view of a trailing edge portion of another typical airfoil of one of the hot gas path components shown in FIG. 2, illustrating a sixth embodiment of an arrangement for cooling the trailing edge portion of the airfoil.

FIG. 9 is an enlarged view of trailing edge portion 64 of another typical airfoil 32 of one of hot gas path components 38 of FIG. 2, illustrating a sixth embodiment of an arrangement for cooling trailing edge portion 64 of airfoil 32 with micro-channels 30 formed on both pressure side surface 58 and suction side surface 60 of airfoil 32. For the embodiment shown in FIG. 9, cooling system 42 of hot gas path component 38 includes a series of micro-channels 30 formed in outer surface 50 of airfoil 32 and covered by braze sheets 68. As described herein, micro-channels 30 are formed by either a casting process or by a casting process and a finish machining process. Alternatively, micro-channels 30 may be formed using a variety of techniques, including, without limitation, laser machining, water jet machining, ECM processes, EDM processes, photolithography, or any other process capable of providing micro-channels with proper sizes and tolerances. In addition, micro-channels 30 can have any lengthwise configuration, for example, without limitation, straight, curved, or having multiple curves. After casting hot gas path component 38, micro-channels 30 can be finished machined. One or more inlet passages 62 are formed to connect micro-channels 30 to plenum 54.

In the exemplary embodiment, braze sheets 68 are coupled to outer surface 50 of hot gas path component 38 and conform to the shape of outer surface 50. For example, without limitation, a braze sheet 68 coupled to convex suction side surface 60 of airfoil 32 conforms to the airfoil surface shape so as to maintain the proper airfoil design. Thus, the original airfoil shape and outer surface location is established by the application of braze sheet 68 to airfoil 32.

As shown in FIG. 9, micro-channels 30 extend substantially axially, i.e., generally parallel with hot gas flow 22. Alternatively, micro-channels 30 can be disposed at any relative locations and extend in any direction that enables cooling system 42 to function as described herein, for example, without limitation, micro-channels 30 may comprise a serpentine configuration. In the exemplary embodiment, inlet passages 62 may be individually coupled in flow communication to plenum 54.

In the exemplary embodiment, hot gas path component 38 includes outlet passage 78 at trailing edge 40 formed in flow communication with one of micro-channels 30 to exhaust pressurized air 24 to one side of trailing edge 40 of airfoil 32. Outlet passage 78 may be any shaped passage or hole that enables outlet passage 78 to function as described herein. Outlet passage 78 is positioned generally in line and at an aft end of each micro-channel 30. In such an embodiment, the opposite side micro-channel 30 is a closed micro-channel, i.e., it has not outlet passage 78. As shown, the closed micro-channel 30 can end before reaching trailing edge 40, enabling the opposite side micro-channel 30 to provide cooling to both sides of the trailing edge of airfoil 32. In the embodiment illustrated in FIG. 9, a cross flow passage 84 is coupled between each of micro-channels 30 at trailing edge 40 to enable pressurized air 24 to flow through each of micro-channels 30 and exit through the single outlet passage 78. In an alternative embodiment, hot gas path component 38 includes a film cooling hole 86 coupled in flow communication to the closed micro-channel 30.

In the exemplary embodiment, hot gas path component 38 includes coating 72 formed over at least a portion of outer surface 50 and braze sheets 68. As described herein, coating 72 includes at least two material layers, for example, a bond coat 74 and a thermal barrier coating (TBC) 76. Bond coat 74 is any appropriate bonding material described herein, and TBC 76 is any appropriate thermal barrier material described herein. In alternative embodiments, hot gas path component 38 can be formed from a high temperature ceramic matrix composite (CMC) and coating 72 can include an environmental barrier coating (EBC) system that includes one or more material layers.

In operation, pressurized air 24 flows through cooling system 42, and in particular, plenum 54, at a pressure generally higher than a pressure in inlet passage 62 and micro-channel 30. The pressure differential causes a portion of pressurized air 24 contained within cooling system 42 to flow into and through inlet passage 62, and from inlet passage 62 into and through micro-channel 30. Inlet passage 62 is configured to provide convection cooling to coating 72. For example, without limitation, inlet passage 62 is oriented at an angle to braze sheet 68, which enables pressurized air 24 to impact on braze sheet 68 with a relatively high velocity, thus increasing the cooling effectiveness of pressurized air 24. As pressurized air 24 flows through inlet passage 62 and is provided to micro-channel 30, pressurized air 24 impacts on braze sheet 68, providing convection cooling of coating 72. After pressurized air 24 flows through micro-channel 30, cooling coating 72 and outer surface 50 of substrate 48, pressurized air 24 may be exhausted from micro-channels 30 through outlet passage 78. For example, without limitation, in one embodiment pressurized air 24 is exhausted off of trailing edge 40 of airfoil 32 and into the path of hot gas flow 22. It should be noted that although outlet passage 78 can be any shaped hole or passage that enables cooling system 42 to function as described herein.

The systems and methods described herein facilitate cooling the trailing edge portion 64 of a hot gas path component 38 at a high heat transfer rate and with a relatively uniform temperature profile by use of near wall cooling micro-channels 30. Specifically, the geometry of micro-channels 30 enabler improved cooling efficiency of trailing edge portion 64. The fabrication of micro-channels 30 and braze sheet 68 facilitate increasing the density and reducing the size of micro-channels 30 to optimize heat transfer efficiency. Cooling system 42 facilitates increasing the life of hot gas path component 38 and enabling hot gas path component 38 to be utilized with higher temperature hot gas flows 22, thus increasing the performance and efficiency of gas turbine engine 10.

The systems and methods described herein are not limited to the specific embodiments described herein. For example, components of each apparatus and system may be utilized independently and separately from other components described herein. For example, the systems and methods may also be used in combination with other turbine systems, and are not limited to practice only with the gas turbine engines as described herein. Rather, the exemplary embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the systems described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the disclosure has been described in terms of various specific embodiments, those skilled in the art will recognize that the disclosure can be practiced with modification within the spirit and scope of the claims.

What is claimed is:

1. A hot gas path component comprising:
   a substrate comprising an outer surface and an inner surface, said inner surface defining a first interior space, said outer surface defining a pressure side surface and a suction side surface, said pressure and suction side surfaces being joined together at a leading edge and at a trailing edge of said hot gas path component, said substrate comprising a trailing edge portion;
   a first cooling passage formed in said suction side surface of said trailing edge portion of said substrate and coupled in flow communication to said first interior space, said first cooling passage comprising a first end and a second end;
   a second cooling passage separate from said first cooling passage and formed in said pressure side surface of said trailing edge portion of said substrate, said second cooling passage coupled in flow communication to said first interior space, said second cooling passage comprising a first end and a second end;
   a cover disposed over at least a portion of said first and second cooling passages, said cover defined by one of a braze sheet and a pre-sintered preform;
   a bond coat formed over said cover;
   a thermal barrier coating formed over said bond coat; and
   an outlet passage defined in said substrate and offset from said outer surface of said pressure side and said outer surface of said suction side, said outlet passage coupled to said second ends of said first and second cooling passages and extending through said trailing edge of said substrate,
   wherein said first interior space is configured to channel a cooling fluid to said first and second cooling passages, and
   wherein said first and second cooling passages are configured to channel the cooling fluid therethrough to said outlet passage to transfer heat away from said cover and said substrate.

2. The hot gas path component in accordance with claim 1 further comprising a first inlet passage coupled in flow communication to said first interior space and at least one of said first cooling passage and said second cooling passage.

3. The hot gas path component in accordance with claim 2, wherein said first inlet passage is coupled in flow communication to said first interior space and said first end of said first cooling passage, said hot gas path component further comprising a second inlet passage coupled in flow communication to said first interior space and said first end of said second cooling passage.

4. The hot gas path component in accordance with claim 1, wherein said substrate further comprises a recess formed in at least one of said pressure side surface and said suction side surface, said recess comprising at least one recess edge defining said second end of at least one of said first cooling passage and said second cooling passage.

5. The hot gas path component in accordance with claim 4, wherein said cover is disposed in said recess such that at least one edge of said cover abuts said recess edge.

6. The hot gas path component in accordance with claim 1, wherein each of said first and second cooling passages comprise a plurality of outlet passages formed through said cover and coupled in fluid communication with said first and second cooling passages, respectively.

7. The hot gas path component in accordance with claim 1, wherein said first and second cooling passages are coupled in flow communication to each other at said second ends.

8. The hot gas path component in accordance with claim 1, wherein said inner surface of said substrate further comprises a second interior space separate from said first interior space, said hot gas path component further comprising an outlet passage coupled in flow communication to said second interior space and said second ends of said first and second cooling passages.

9. The hot gas path component in accordance with claim 1 further comprising an outlet passage coupled in flow communication with one of said first cooling passage and said second cooling passage, said outlet passage formed through one of said pressure side surface and said suction side surface at said trailing edge.

10. The hot gas path component in accordance with claim 9 further comprising a cross flow passage coupled between said first cooling passage and said second cooling passage at said second ends, respectively, said cross flow passage configured to enable the cooling fluid to flow through each of said first and second cooling passages and exit through said outlet passage.

11. A gas turbine engine comprising:
    a compressor;
    a turbine coupled to said compressor; and
    a hot gas path component disposed in said turbine, said hot gas path component comprising:
      a substrate comprising an outer surface and an inner surface, said inner surface defining a first interior space, said outer surface defining a pressure side surface and a suction side surface, said pressure and suction side surfaces being joined together at a leading edge and at a trailing edge of said hot gas path component, said substrate comprising a trailing edge portion, wherein said substrate further comprises a recess formed therein, said recess comprising a bottom surface and at least one recess edge;
      a first cooling passage formed in said suction side surface of said trailing edge portion of said substrate and coupled in flow communication to said first interior space, said first cooling passage comprising a first end and a second end;
      a second cooling passage separate from said first cooling passage and formed in said pressure side surface of said trailing edge portion of said substrate, said second cooling passage coupled in flow communication to said first interior space, said second cooling passage comprising a first end and a second end, wherein at least one of said first and second cooling passages extend at least partially along said bottom surface of said recess, and wherein said second end of at least one of said first cooling passage and said second cooling passage is defined by said at least one recess edge, said at least one recess edge extending over and defining a depth of said recess; and a cover comprising a first surface, an opposite second surface, and a thickness defined therebetween, said first surface disposed along said bottom surface of said recess over at least a portion of said first and second cooling passages, said thickness being equal to said depth of said recess;

wherein said first interior space is configured to channel a cooling fluid to said first and second cooling passages, and wherein said first and second cooling passages are configured to channel the cooling fluid therethrough to transfer heat away from said cover and said substrate.

12. The gas turbine engine in accordance with claim 11 further comprising a casing comprising a cooling fluid supply conduit.

13. The gas turbine engine in accordance with claim 12, wherein said cooling fluid supply conduit is coupled in fluid communication to said first interior space.

14. The gas turbine engine in accordance with claim 11, wherein said hot gas path component further comprises a coating disposed along at least a portion of said outer surface of said substrate, wherein said coating extends over at least a portion of said cover.

15. The gas turbine engine in accordance with claim 11 further comprising a first inlet passage coupled in flow communication to said first interior space and at least one of said first cooling passage and said second cooling passage.

16. The gas turbine engine in accordance with claim 11, wherein said cover is disposed in said recess such that at least one edge of said cover abuts said recess edge.

17. The gas turbine engine in accordance with claim 11, wherein a depth of said recess is a uniform depth relative to and conforming to said outer surface of said substrate.

18. The gas turbine engine in accordance with claim 17, wherein the depth of said recess is substantially equal to a thickness of said cover.

* * * * *